United States Patent [19]

Takeda et al.

[11] 4,190,485

[45] Feb. 26, 1980

[54] METHOD OF WELDING A THERMOSHRINKABLE SHEET AND A DEVICE FOR USE IN THE METHOD

[75] Inventors: Kazutoki Takeda, Mito; Yasuo Negishi, Yokohama; Yutaka Hibino, Osaka, all of Japan

[73] Assignee: Sumitomo Electric Industries, Ltd., Osaka, Japan

[21] Appl. No.: 846,505

[22] Filed: Oct. 26, 1977

[30] Foreign Application Priority Data

Nov. 5, 1976 [JP] Japan .................................. 51/133349

[51] Int. Cl.² ........................ B30B 15/34; B32B 31/00
[52] U.S. Cl. ................................ 156/583.9; 74/522; 74/525; 100/93 P; 100/283; 156/85; 219/243
[58] Field of Search ................ 156/85, 334, 247, 378, 156/309, 579, 315, 583, 323, 313; 427/407 E; 428/516; 219/243; 100/93 P, 283, 281; 93/416.1; 74/520, 525, 522

[56] References Cited

U.S. PATENT DOCUMENTS

| | | | |
|---|---|---|---|
| 2,478,121 | 8/1949 | Morner | 156/306 |
| 2,644,151 | 6/1953 | Krueger | 156/583 |
| 2,936,261 | 5/1960 | Cole | 156/309 |
| 3,106,630 | 10/1963 | Klamp | 219/243 |
| 3,450,031 | 6/1969 | Peterson | 100/93 P |
| 3,617,419 | 11/1971 | Fischer | 156/334 |
| 3,891,490 | 6/1975 | Humphries | 156/334 |
| 3,926,033 | 12/1975 | Forichon | 100/272 |

*Primary Examiner*—William A. Powell
*Assistant Examiner*—J. J. Gallagher
*Attorney, Agent, or Firm*—Wenderoth, Lind & Ponack

[57] ABSTRACT

A method of welding a thermoshrinkable sheet comprises inserting between opposing faces of the sheet to be welded a piece of uncrosslinked resin tape containing peroxide, securing heat-resisting tapes on and adjacent outer faces of a welding portion of the sheet, and heating and pressing the welding portion.

A device for use in the method includes a pressing plate having a heater, a receiving plate, a first link pivotally connected at one end to one end of the receiving plate and at the other end to the pressing plate, an operation lever pivoted on one end of the receiving plate, a second link pivotally connected to the free end of the operation lever and to the first link. The first and second links and the operation lever constitute a power amplifier mechanism in which the turning force of the operation lever is amplified to the pressure of the pressing plate through the second and first links.

3 Claims, 9 Drawing Figures

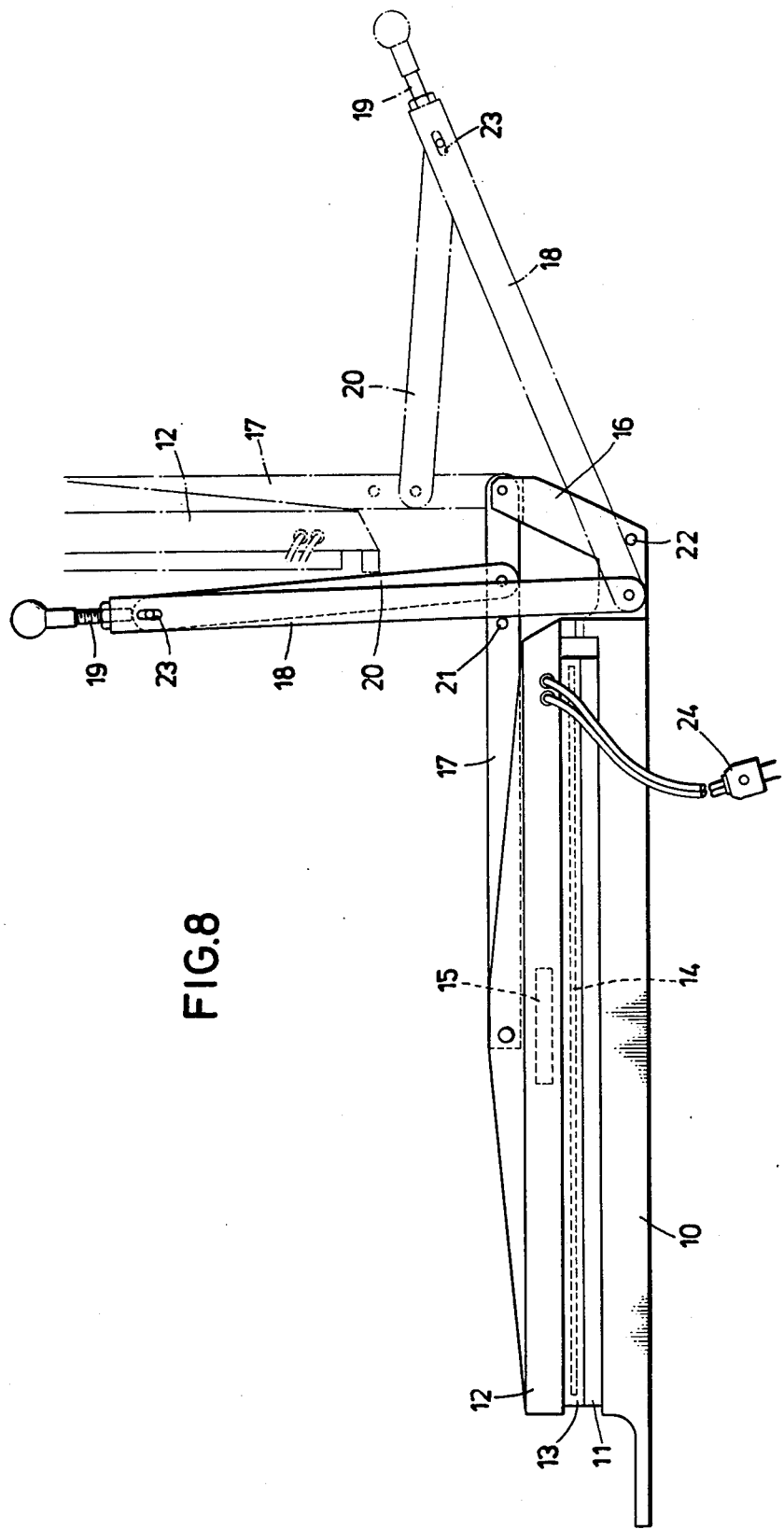

METHOD OF WELDING A THERMOSHRINKABLE SHEET AND A DEVICE FOR USE IN THE METHOD

The present invention relates to a welding method of thermoshrinkable synthetic resin sheet covering a joint of electric wire, cable, plastic pipe, steel pipe or the like, and a welding device for use in the method.

Conventionally, in order to protect a joint, there have been adopted a method of winding a synthetic resin tape around a joint of electric wire or cable, and a method of shrink-fitting a thermoshrinkable synthetic resin sleeve about a joint. The former method, however, greatly reduces the operation efficiency when the working space is limited, while the latter method not only requires to prepare a variety of sleeves meeting different sizes of cable but also makes it difficult to repair an old joint.

In view of the above defects, there has been proposed a method in which a joint is covered with a synthetic resin sheet, both ends thereof are welded together by the heat, and thereafter the sheet is, if necessary, thermally shrunken. However, the sheet will not be sufficiently sealed simply by heat-welding, resulting in lack of strength of sealed portion. Moreover, when a thermoshrinkable synthetic resin sheet is used, welded ends and adjacencies thereof are deformed due to the shrinkage by the application of heat during welding, whereby the sheet will not tightly fit about the cable joint.

A primary object of the present invention is to obviate the above defects, and to provide a welding method of thermoshrinkable synthetic resin film or sheet which assures to obtain a reliable seal and to minimize the influence of heat adjacent the sealed portion.

Meanwhile, in order to efficiently perform the above welding of sheet, there is required a device compact in mechanism, handy to carry, operable in a limited space, and larger in pressing force.

Accordingly, it is another object of the present invention to provide a device which meets the above various requirements for use in the method of the invention.

The present invention will be apparent from the following description of the invention with reference to the accompanying drawings, in which:

FIG. 8 is a side elevation showing a welding device of the invention; and

Throughout the drawings, similar parts and elements are designated by the similar reference numerals and letters.

Figure 1:
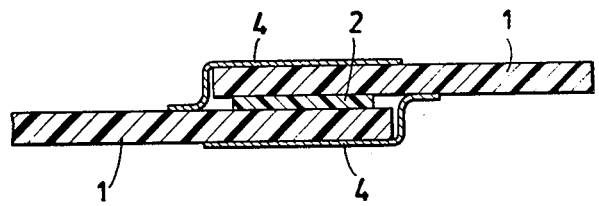
FIGS. 1 through 4 are sectional views showing structures of welded portions of sheets by the application of the method of the invention.
Figure 2:
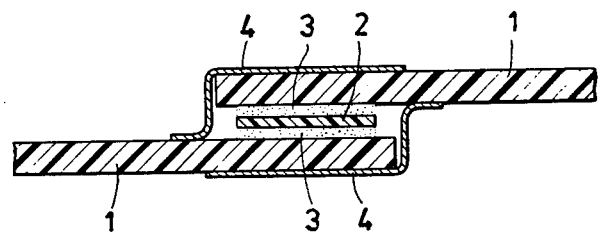

FIGS. 1 and 2 show an embodiment in which monoaxially oriented films or sheets 1 are overlapped at their ends and are to be welded together. Each of the sheet 1 comprises crosslinked polyethylene or ethylene copolymer such as ethylene vinyl acetate copolymer, ethylene ethyl acrylate copolymer and ethylene glycidyacrylate ethylacrylate copolymer.

As shown, initially, the faces to be welded are cleaned, and inserted with a piece of uncrosslinked polyethylene or uncrosslinked ethylene copolymer tape 2, which contains 0.5 to 5 weight %, preferably 2 to 3 weight % of at least one of peroxides such as dicumyl peroxide, 1.3-bis(t-butyl peroxy-isopropyl) benzene, 1.1-di-t-butyl peroxy-3.3.5-trimethyl cyclohexane, t-butyl cumyl peroxide, 2.5-dimethyl-2.5 di-(t-butyl peroxy)-hexane, 2.5-dimethyl-2.5-di-(t-butyl peroxy)-hexyne-3. Further, there can be contained in the tape 2, other than the peroxides, at least one of polyfunctional monomer such as diallyl phthalate, trimethylool propan trimethacrylate, ethylene glycol diacrylate, ethylene glycol dimethacrylate, allyl acrylate. The rate of addition is 0.5 to 5 weight %, preferably 2 to 3 weight %.

Still further, as shown in FIG. 2, the faces to be welded and/or both faces of the tape 2 may be coated with, as a crosslinking agent, a liquid or paste peroxide 3 such as t-butyl cumyl peroxide, 2.5-dimethyl-2.5 di-(t-butyl peroxy)-hexane, 2.5-dimethyl-2.5-di-(t-butyl peroxy)-hexyne-3.

Then, heat-resisting adhesive tapes 4 made of, for example, glass fibre, aluminium, teflon (trademark), or epoxy resin impregnated paper or cloth are secured to the outer faces of welding portion and adjacencies thereof where the heat is to be applied. As a result, the ends of the sheets 1 are securely connected with each other so as not to separate, and the tape 2 can be held at its position without displacing.

With the above connecting structure, the pressure as well as heat is applied to the outer faces of the heat-resisting tapes 4, 4, thus welding the ends of the sheets 1. During welding, since the adjacencies of the welding portion are covered with the heat-resisting adhesive tapes 4, the parts are protected from heat, and can be maintained below the temperature of shrinkage, thus making it possible to prevent the sheets from partially shrinking. Further, the tapes 4 avoid the necessity of applying any releasing agent to a heating and pressing plate of a welding device or necessity of constituting the pressing plate with a specific material for the purpose of preventing the sheets 1 from welding to the pressing plate.

The welding may be performed at 150 to 250° C., preferably at about 210° C., under a pressure of 0.5 to 5.0 kg/cm², preferably about 3 kg/cm², for 1 to 60 minutes, preferably about 4 minutes.

Figure 3:
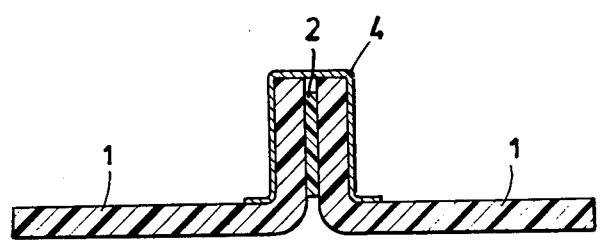
Figure 4:
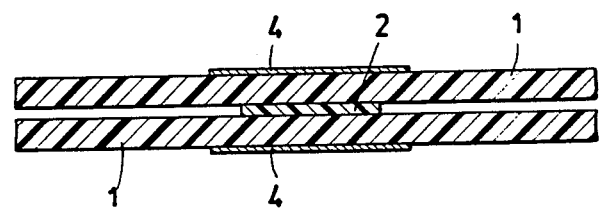

FIG. 3 shows an embodiment in which the sheets 1 are connected together at their upturned abutting ends. FIG. 4 illustrates an embodiment in which the sheets 1 overlapping one on the other are connected together at their middle portions. In any case, the sheets 1 can be welded by pursuing substantially the same process as above with substantially the same results. Of course, similarly to the case of FIG. 2, a fluid peroxide 3 can be interposed between the tape 2 and the faces of the sheets 1 to be welded.

The sheets 1 welded by each of the above process are subjected to a peeling test. As a result, there occurs a matrix tearing without any peeling at the interface of the welded portion.

Figure 5:
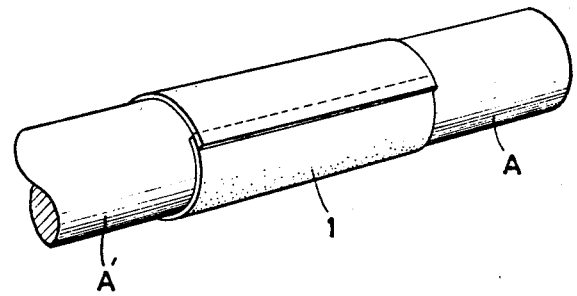
FIGS. 5 through 7 are perspective views illustrating joints of cables covered with thermoshrinkable sheets.
Figure 6:
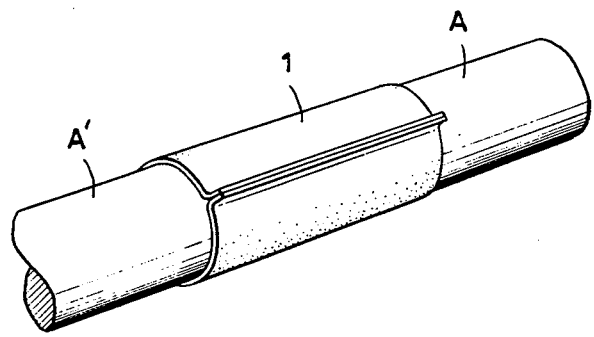

FIGS. 4 to 6 illustrate that the joints of electric cables A and A' are covered with the sheet 1, which was formed into a tube by connecting both ends thereof by means of the abovementioned method so that the oriented direction of the sheet directs circumferentially, and was then thermally shrunken to tightly fit about the joints. At this time, the tube is heated at 120° to 300° C. for 1 to 20 minutes.

Figure 7:
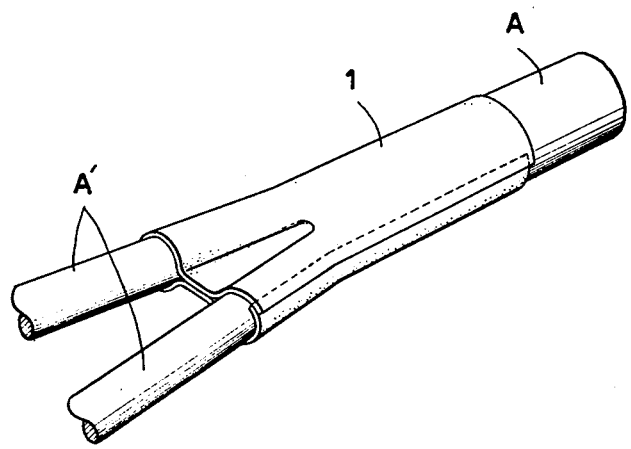

In FIG. 5, both ends of the sheet 1 are welded together by the method of FIG. 1 in which the ends overlap one on the other. In FIG. 6, the ends of the sheet 1 are welded by upturning and abutting to each other. In FIG. 7, the ends of the sheet 1 are welded together similarly to FIG. 1, but the sheet 1 is connected at the branching portion of the cable A' by the application of the method of FIG. 4.

In order to prevent the separation at the connecting portion of the sheet 1 consisting of crosslinked polyethylene or ethylene copolymer when it is thermally shrunken, it is preferable to use the material of which the rate of gel content ranges from 20 to 65 weight %.

In a modification, a tube is previously prepared by welding the ends of the sheets 1 pursuing the method of the invention, and is then fitted about one of the cables A, A'. After the cables are connected to each other, the tube is moved to the joint, and is heat-shrunken.

When the tube is heat-shrunken in any of the above embodiments, the heat-resisting adhesive tapes 4 can be left at their positions, but preferably are peeled. Since the tape of this kind is stiff and lacks flexibility, it will not closely fit to the tube upon heat-shrinkage thereof, and changes its color due to the heat, exhibiting bad appearance.

Figure 9:
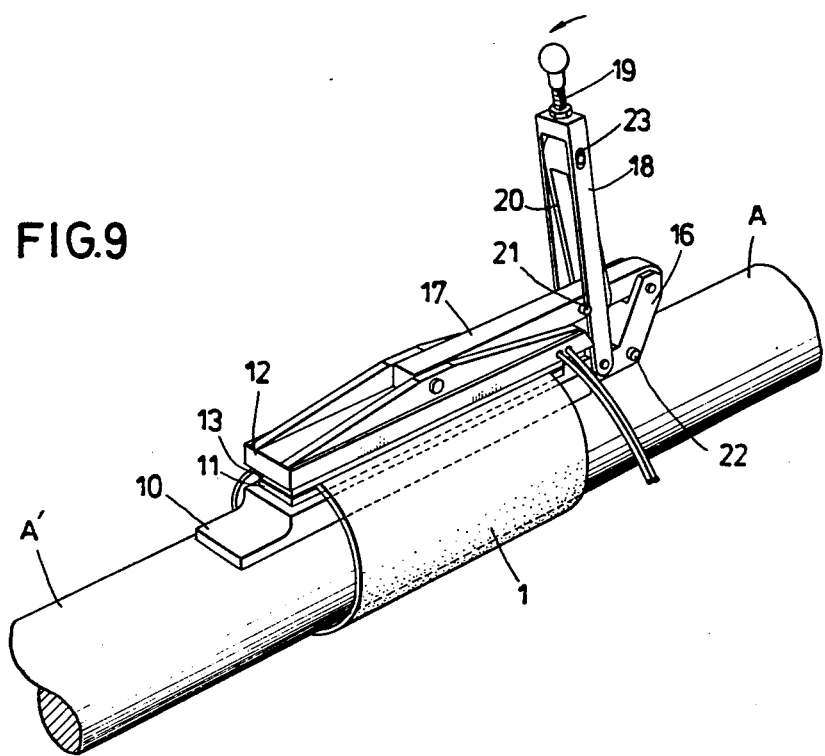
FIG. 9 is a perspective view of the same in use for welding a sheet which covers about a joint of cable.

FIGS. 8 and 9 show a device for use in welding the sheet 1. As seen, a base board 10 carries a receiving plate 11 secured thereto, and an openable board 12 a pressing plate 13 which incorporates a heater 14. A thermosensitive element 15 may be incorporated within the openable board 12.

From the rear end of the base board 10 extends upwardly a bracket 16, to the upper end of which is pivotally connected one end of a link 17, the other end of which is pivoted on the central part of the openable board 12 so that the board 12 turns towards or away from the base 10 by the pivotal movement of the link 17.

To the lower end portion of the bracket 16 is pivotally connected a forked lever 18 at its one end. Into the free end of the lever 18 is threaded a thumb screw 19. By revolving the screw 19, the end of the screw moves upwardly and downwardly, thereby effecting the adjustment of pressure, the details of which will be explained hereinafter.

The upper end of the lever 18 and the link 17 are connected to each other by a link 20. Accordingly, when the lever 18 is turned, the link 17 is caused to turn through the intermediary of the link 20, thus allowing the openable board 12 to turn towards or away from the base board 10. Further, the lever 18, link 20 and link 17 constitute a toggle joint linkage known as a power amplifier mechanism, when the pressing plate 13 is pressed against the receiving plate 11.

Stops 21 and 22 are provided on the link 17 and bracket 16, respectively for defining the rotation of the lever 18. A pivot on one end of the link 20 is inserted in a slot 23. Electrical wires 24 are connected to the openable board 12 so as to supply a power to the heater 14.

Though not shown in the drawings, a heat insulation material may be interposed between the openable board 12 and pressing plate 13, and between the base board 10 and receiving plate 11.

In operation of the device of the invention, initially the thumb screw 19 is revolved so as to adjust the pressure of the pressing plate 12 by setting the fulcrum of the link 20 in relation to the lever 18, the fulcrum being defined by the end of the screw 19 which abuts the outer end of the link 20.

Then, as shown in FIG. 9, the base board 10 is inserted between the joint of cables A, A' and the overlapping ends of the sheet 1 to be sealed which covers the joint. The openable board 12 is then placed on the overlapping ends of the sheet 1, the lever 18 being pushed in the direction of arrow, the portion to be sealed being pressed by the pressing plate 13 against the receiving plate 11, and heated by the heater 14, thus effecting the welding. The pressure of the pressing plate 13 becomes maximum when the fulcra at both ends of the link 20 and that of the lever 18 are aligned. However, if the stop 21 positions slightly leftwardly of that position of maximum pressure and the lever 18 is received by the stop 21, the lever 18 can be held at its position without returning to the right, as shown by the solid lines in FIG. 8.

As described hereinbefore in detail, since the device of the invention is incorporated with a power amplifier mechanism for increasing the pressing force, and with an adjustment means therefor, it is possible to obtain a suitable pressure in accordance with different thickness of the sheet, thus enabling the increase of reliability of the sealed portion. Further, the device is compact, and it is suitable for carrying and operating at a limited space.

What is claimed is:

1. A device for use in welding overlapping ends of a synthetic resin sheet, which comprises:
    a base;
    a bracket extending upwardly from the rear end of the base;
    a receiving plate fixedly mounted on the base;
    an openable board with a thermosensitive element incorporated therein;
    a pressing plate secured to the openable board having a heater incorporated therein;
    a first link pivotally connected at one end of the upper end of the bracket and the other end to the openable board;
    an operation lever pivotally connected at one end to the lower end of the bracket;
    a second link pivotally connected at one end to the free end portion of the operation lever and at the other end to the first link;
    whereby the operation lever, and the first and second links constitute a power amplifier mechanism when the pressing plate is pressed against the receiving plate on which the overlapping ends of the sheet are placed while the cylindrical materials are placed under the base; and
    an adjustment means for adjusting the toggle linkage which comprises a thumb screw threaded into the free end of the operation lever, and a pivot serving as a fulcrum of the second link, the pivot being inserted into a slot provided adjacent the free end of the operation lever so that the end of the thumb screw abuts the end of the second link.

2. A device as claimed in claim 1, wherein a stop is provided on the rear end of the bracket and on the rear end portion of the first link so as to define the pivotal movement of the operation lever.

3. A device as claimed in claim 1, wherein the pressing plate is fixedly mounted on an openable board which is pivotally connected to the first link with a heat insulating material inserted between the pressing plate and the openable board and wherein a heat insulating material is inserted between the receiving plate and the base.

* * * * *